Patented Aug. 14, 1951

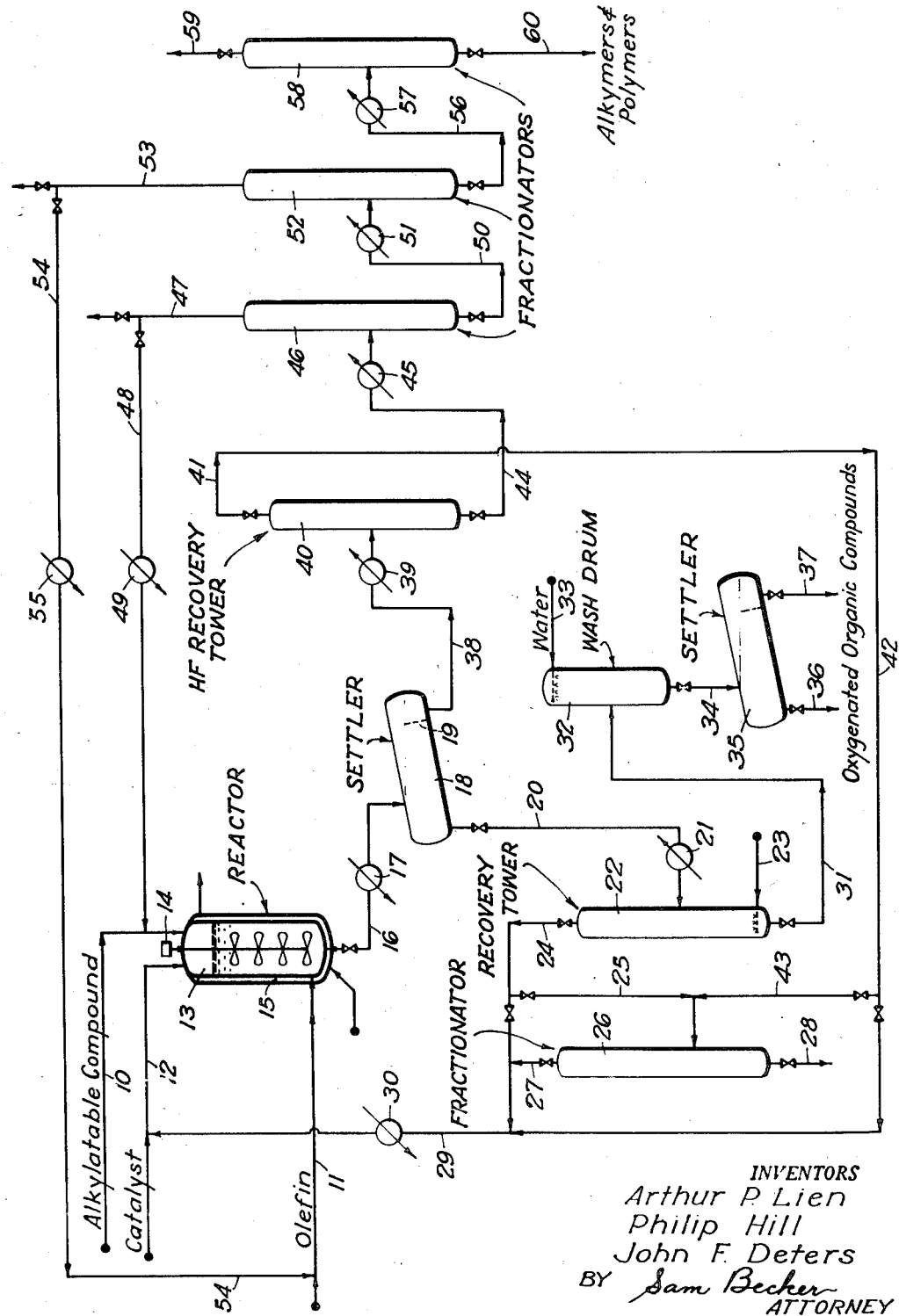

2,564,072

UNITED STATES PATENT OFFICE 2,564,072

ALKYLATION PROCESS

Arthur P. Lien and Philip Hill, Hammond, and John F. Deters, Valparaiso, Ind., assignors to Standard Oil Company, Chicago, Ill., a corporation of Indiana Application December 18, 1947, Serial No. 792,520

6 Claims. (Cl. 260—671)

This invention relates to a process for the treatment of olefinic hydrocarbon fractions, hereinafter described in more detail, to remove preferentially oil-soluble, neutral, oxygen-containing organic compounds therefrom as a fraction substantially uncontaminated with polyolefinic hydrocarbons and simultaneously to convert mono-olefins in said olefinic hydrocarbon fraction to valuable alkymers uncontaminated by substantial, or even appreciable, amounts of said oxygen-containing organic compounds.

Olefinic hydrocarbons suitable for use in the process of the invention, hereinafter called Synthol olefins, containing the above-mentioned preferentially oil-soluble, neutral, oxygenated organic compounds are prepared by a modification of the Fischer-Tropsch process employing iron catalysts, preferably in the form of a fluidized catalyst bed. Synthesis gas consisting essentially of a mixture of carbon monoxide and hydrogen is produced by partial oxidation of natural gas or other hydrocarbon gas, suitable operating conditions being, for example, a temperature of about 2500° F. and a pressure of about 250 p. s. i. g. Synthesis gas may also be produced by conventional processes of reforming natural gas with steam in the presence of a catalyst; when desired, both the oxidation and reforming processes may be employed to generate synthesis gas. The $H_2:CO$ ratio in the synthesis gas may be adjusted as desired, usually to a ratio between about 2:1 and about 5:1 in the reactor. A variety of iron-containing catalysts may be employed. The catalysts may be prepared by the reduction of fused iron oxides, mill scale, or pyrites-ash and may be sintered before or after reduction to obtain improved activity and life. The iron catalysts are suitably promoted by small amounts of alkali metal components such as KOH, $K_2CO_3$, KF or the corresponding sodium compounds. A suitable catalyst, for example, is the commercial ammonia synthesis catalyst frequently employed in the United States, known as the C. C. C. catalyst; essentially this catalyst is iron promoted by small amounts of alkali. Synthesis is effected in reactors utilizing a fluidized iron catalyst bed at temperatures between about 450 and about 700° F. and pressures between about 200 and about 500 p. s. i. g.

Among the hydrocarbon products produced in the above-described synthesis operation are olefinic hydrocarbon fractions which contain-paraffin hydrocarbons of approximately the same carbon number and boiling range and in addition a substantial amount of preferentially oil-soluble, neutral oxygen-containing organic compounds such as aldehydes, ketones, esters, acetals, ethers, alcohols and the like. We have observed that these olefinic hydrocarbon fractions, with which the preferentially oil-soluble oxygen-containing organic compounds are associated, contain, on the average, 7 and more carbon atoms per molecule of the hydrocarbons present. The oxygenated compounds present in the above-mentioned Synthol olefin hydrocarbon fractions cannot be removed to any satisfactory degree by simple washing with water, alkalies or specific group reagents, for example, aqueous sodium bisulfite for the removal of carbonyl compounds.

The proportion, and possibly to some extent the nature of the oxygenated compounds produced in the iron-catalyzed Synthol process, will naturally depend upon and vary with the specific catalyst, catalyst age and operating conditions employed. Table 1 sets forth data concerning the composition of typical iron-Synthol olefin fractions.

TABLE 1

| Carbon atoms | Neutral, oil-soluble-oxygenated organic compounds, Vol. per cent | Carbonyl compounds, Vol. per cent of total oxy. compounds | Olefins | | Aromatics, Vol. per cent |
|---|---|---|---|---|---|
| | | | Vol. per cent | Per cent iso | |
| 7 | 14.1 | 70 | 72 | 25 | 7 |
| 8 | 12.8 | 59 | 70 | 30 | 10 |
| 9 | 12.0 | 53 | 70 | 35 | 12 |
| 10 | 11.1 | 46 | 70 | 40 | 13 |
| 11 | 10.9 | 45 | 70 | 42 | 14 |
| 12 | 12.3 | 44 | 70 | 45 | 14 |
| 13 | 10.0 | 43 | 70 | 48 | 14 |
| 14 | 10.1 | 48 | 70 | 50 | 13 |
| 15 | 9.8 | 45 | 70 | 50 | 12 |
| 16 | 9.3 | 40 | 70 | 55 | 11 |
| 17 | 8.4 | 30 | 70 | 55 | 10 |
| 18 | 9.3 | 33 | 70 | 60 | 10 |
| 19 | 9.75 | 50 | 70 | 60 | 10 |
| 20 | 8.65 | 33 | 70 | 65 | 10 |
| 21–25 | 8.65 | 33 | 70 | 70 | 9 |
| 26–30 | 6.0 | 17 | 70 | 75 | 8 |
| 31–40 | 3.64 | 10 | 70 | 80 | 7 |
| 41+ | 4.3 | 7 | 70 | 80 | 5 |

Particularly interesting for the alkylation of monocyclic aromatic hydrocarbons such as benzene and toluene to yield alkymers suitable for sulfonation and neutralization to produce detergents are $C_{11}$—$C_{15}$ Synthol olefins having typical properties as follows:

TABLE 2

| Synthol fraction, avg. No. of C atoms | $C_{11}$ | $C_{12}$ | $C_{13}$ | $C_{14}$ | $C_{15}$ |
|---|---|---|---|---|---|
| Boiling range, °F./10 mm. of Hg | 150–175 | 175–200 | 200–225 | 225–250 | 250–275 |
| Olefin content, wt. % | 74 | 68 | 67 | 63 | 62 |

It is desirable, on the one hand, to remove the oxygen-containing compounds from Synthol olefinic hydrocarbon fractions so that the oxygen-containing compounds may be sold as solvents, employed as starting materials for chemical synthesis and the like. It is desirable, on the other hand, to convert the mono-olefins in the above-mentioned olefinic hydrocarbon fractions to alkymers suitable for various purposes, especially as raw materials for sulfonation to yield superior detergents.

A vast amount of effort has been expended, both in research and in commercial production, to produce alkyl aromatic sulfonates of superior quality. It has been found that essentially normal or straight chain alkyl groups in alkyl aromatic sulfonates contribute to the production of detergents, i. e., household and commercial washing and scouring agents, of a quality which is greatly superior to that of alkyl aromatic sulfonates containing highly branched alkyl groups. With the advent of olefinic hydrocarbon fractions obtained from commercial operation of plants for the hydrogenation of carbon monoxide, as described above, a new and cheaper source of olefinic fractions consisting essentially of normal mono-olefins and containing, at most, one or two methyl branches, appeared for the synthesis of alkyl aromatic compounds having essentially unbranched alkyl groups. These new alkymers yield superior detergents upon mono-sulfonation and neutralization. The new superior detergents may be employed in hard water without "builders" and water-softening agents such as sodium sulfate, tetrasodium pyrophosphate, sodium hexametaphosphate or the like. As a consequence, the essentially straight chain alkyl aromatic sulfonates are greatly desired.

The presence of oxygen-containing organic compounds in aromatic alkymers derived from Synthol olefinic hydrocarbon fractions is highly undesirable. We have noted that some fractions of oxygenated organic compounds obtained from Synthol olefins possess dark color. Sulfonation of the alkyl aromatic compounds to produce detergents is usually conducted with very concentrated or fuming sulfuric acid, in the course of which oxygen-containing organic compounds undergo resinification and darkening, resulting in the production of dark-colored, resin-containing sulfonic acids.

Attempts to effect the elimination of oxygen-containing organic compounds from Synthol olefins by extraction with sulfuric acid were not successful. When a $C_{11}$—$C_{15}$ Synthol fraction containing 67 percent olefins and 2.5 percent oxygen was contacted with 5 percent by weight of 95 percent sulfuric acid at 32° F., the oxygen content was reduced only by 30 to 34 percent; two treats of 10 percent by weight of 78 percent sulfuric acid at 32° F. removed 53 percent of the oxygen; treatment with 15 percent by weight of boric acid followed by 5 percent by weight of 95 percent sulfuric acid at 32° F. removed only 50 percent of oxygen content. Sulfuric acid treatment of Synthol olefins is accompanied by serious losses of olefins. Treatment with aluminum chloride resulted in considerable olefin polymerization and very incomplete removal of oxygenated organic compounds. Treatment of a $C_{13}$ Synthol olefin fraction with 10 volume per cent of 95 per cent sulfuric acid applied in two equal batches at 60° F. for 25 minutes resulted in a 50 volume per cent loss of Synthol liquid. Although treatment of a $C_{13}$ Synthol olefin fraction with 3 volume per cent of 95 per cent sulfuric acid at 60° F. for 35 minutes reduces the treating loss to 14 volume per cent of the Synthol fraction, significant and alkylation-inhibiting quantities of oxygenated organic compounds remained in the treated Synthol fraction. This is demonstrated by the fact that upon alkylation of toluene with the treated Synthol fraction only a low yield of alkymer was obtained, as set forth in run 7 of Table 3 hereinafter.

Extraction of oxygen-containing compounds from Synthol olefins was also attempted by the use of liquid, substantially anhydrous hydrogen fluoride as the solvent. A $C_{12}$ Synthol fraction containing 67 per cent olefins was treated at 45–60° F. with 8 per cent by volume of liquid, substantially anhydrous hydrogen fluoride, following which a lower layer of liquid hydrogen fluoride containing extracted materials was separated from a supernatant hydrocarbon layer. Extensive polymerization and alkyl fluoride production occurred as a result of this treatment.

Attention was thereafter concentrated on processes wherein it was proposed to treat the olefinic hydrocarbon fraction containing oxygenated organic compounds with alkylatable organic compounds and reagents which, it was hoped, would serve simultaneously as solvents for said oxygenated compounds and as catalysts to induce the alkylation of said alkylatable organic compounds by the mono-olefins contained in said fraction to produce valuable alkymers. Specifically, we have investigated the alkylation of benzene and toluene with Synthol olefin fractions containing mono-olefins having 7 to 15 carbon atoms, inclusive, in the molecule in the presence of aluminum chloride, phosphoric acid, sulfuric acid and liquid hydrogen fluoride.

Surprisingly, we have discovered that the presence of certain oxygenated organic compounds in the Synthol olefin fractions markedly inhibits the desired alkylation reactions in the presence of aluminum chloride, sulfuric acid and phosphoric acid catalysts and that olefin losses due to polymerization to nondescript products are high. Further, we have not found it feasible to recover oxygenated organic compounds from the aluminum chloride complexes and spent sulfuric or phosphoric acids. These observations are amplified by the specific data set forth in Table 3 and by the accompanying comments. We believe that the carbonyl compounds contained in the Synthol olefin fractions exert the greatest "poisoning" or inhibiting effects on the alkylation reactions in question and consider that alcohols exert little or no alkylation inhibiting effect for reasons which will be detailed hereinafter.

In the presence of liquid, substantially anhydrous hydrogen fluoride, we have observed that alkylation of aromatic hydrocarbons by Synthol olefins containing oxygenated organic compounds takes place smoothly and in high yields and that very substantial, often complete, dissolution of oxygenated organic compounds in the liquid hydrogen fluoride occurs. We have, further, found it possible to recover oxygenated organic compounds from the partially spent liquid hydrogen fluoride which can be recovered from the reaction mixture by gravity separation from HF-insoluble hydrocarbons. Recovery of oxygenated organic compounds from solution in liquid hydrogen fluoride can be effected by distilling, vaporizing or stripping hydrogen fluoride from the solution, for example, with inert gases such as air, nitrogen, carbon dioxide, flue gases, normally gaseous paraffin hydrocarbons such as methane, propane or butanes, leaving oxygenated organic compounds as the unvaporized residue; also by diluting the hydrogen fluoride solution to produce a lower layer of aqueous hydrogen fluoride and a supernatant layer of water-insoluble, neutral oxygenated organic compounds. The oxygenated organic compounds recovered from their solution in liquid hydrogen fluoride can be separated and fractionated by known techniques.

In runs 1 to 5, inclusive (Table 3), Synthol olefin fractions not previously treated for the removal of neutral, oxygenated organic compounds were employed for the alkylation of toluene in the presence of aluminum chloride. In these runs, toluene was mixed in the reactor with the indicated amount of aluminum chloride (activated by a small amount of HCl) and the Synthol olefin was gradually added to the well-stirred mixture over the course of the alkylation period at a rate sufficient to maintain the stated alkylation temperature. The same order of addition was employed with the other catalysts in the runs reported in Table 3. Upon completion of the alkylation reactions set forth in Table 3, stirring was discontinued and the hydrocarbon and catalyst layers were allowed to settle and were separated. The hydrocarbon layer was fractionally distilled to recover unreacted Synthol olefins, alkymer and a high boiling residue. The high boiling residues were found to consist essentially of polymers derived from the olefin charging stock probably mixed with some polyalkylated aromatic hydrocarbons.

In run 7, the $C_{13}$ Synthol olefin fraction was pretreated by extraction with 3 volume per cent of 95 per cent sulfuric acid at 60° F. for 35 minutes, resulting in removal of some oxygenated organic compounds and a treating loss amounting to 14 volume per cent of the olefin fraction charged. However, the yield obtained in run 7 was identical with that in run 3, viz., 60 per cent of theory, indicating no alkymer yield improvement based on the total olefins charged.

It is difficult to believe that alcohols contribute significantly to the inhibition of the alkylating activity of the aluminum chloride, since relatively low yields of alkymer were obtained with gross amount of catalyst even at high temperatures in the range of 185 to 250° F. J. F. Norris and B. M. Sturgis (J. Am. Chem. Soc., 61, 1415 (1939)) have reported that methanol and ethanol alkylations of benzene proceed at temperatures of 80 to 100° C. (176 to 212° F.). On the contrary, it seems probable that alcohols alkylate aromatic compounds in the presence of aluminum chloride and hydrogen fluoride catalysts; however, due to the small amount of alcohols present in the Synthol olefins, the yield of alkymer is not significantly increased due to the alkylation of aromatic compounds with alcohols.

TABLE 3

Alkylation with miscellaneous catalysts

| Run No. | 1 | 2 | 3 | 4 | 5 | 6 | 7 | 8 | 9 | 10 | 11 |
|---|---|---|---|---|---|---|---|---|---|---|---|
| Synthol Olefin Fractions, carbon atoms: | | | 13 | | | cetene [1] | 13 | | | 12 | |
| Vol. per cent olefins | | | 66 | | | 100 | 66 | | | 67 | |
| Boiling Range, 10–90%, °F | | | 438–444 | | | 270–275°/5 mm | 438–444 | | | 406–412 | |
| Aromatic hydrocarbon | | | toluene | | | | | | | toluene | |
| Catalyst | | | $AlCl_3$ | | | | | | | U. O. P. | 95% $H_2SO_4$ |
| Alk. temp., °F | 60 | 110 | 185 | 240 | 250 | 80 | 60 | 320 | 410 | 510 | 75 |
| Alk. time, min | 30 | 47 | 20 | 23 | 30 | 19 | 35 | 150 | 270 | 270 | 75 |
| Charge, weight per cent on Synthol: | | | | | | | | | | | |
| Synthol olefin | 100 | 100 | 100 | 100 | 100 | 100 | 100 | 100 | 100 | 100 | 100 |
| Aromatic | 220 | 220 | 220 | 220 | 220 | 212 | 220 | 222 | 222 | 222 | 220 |
| Catalyst | 10 | 6 | 10 | 5 | 10 | 2 | 6 | 75 | 129 | 116 | 55 |
| Recovery, weight per cent on Synthol: | | | | | | | | | | | |
| Synthol | 25 | 28 | 32 | 30 | 36 | | 29 | | | 78 | 78 |
| Alkymer | 52 | 52 | 69 | 72 | 74 | 121 | 69 | | | 11 | 19 |
| Boiling Range, °F | | | 340–370°/5 mm. | | | 400–410°/5 mm | 340–370°/5 mm | | | 310–340°/5 mm. | |
| Residue | 29 | 31 | 15 | 19 | 7 | | 11 | | | 11 | 10 |
| Alkymer, per cent of theory | 45 | 45 | 60 | 63 | 65 | 86 | 60 | | | 9 | 18 |

[1] Contains no oxygenated compounds.

In run 1, the moderate temperature of 60° F. and the rather large proportion of 10 weight per cent of aluminum chloride led to the production of only 45 per cent of the theoretical yield of alkymer. The same yield of alkymer was obtained in run 2 although the temperature was raised to 110° F. and the amount of aluminum chloride catalyst was reduced somewhat. In run 3, the high temperature of 185° F. and catalyst concentration of 10 weight per cent were employed but led to the disappointing alkymer yield of only 60 per cent of theory. No substantial further improvement in alkymer yield could be obtained even at 250° F., as will be seen from the data of runs 4 and 5. Run 6 served as a control against runs 1 to 5. It will be noted that with cetene (containing no oxygenated compounds), the use of only 2 weight per cent of aluminum chloride at the low temperature of 80° F. and the short reaction period of 19 minutes yielded 86 per cent of the theoretical yield of alkymer. A comparison of the data obtained in run 6 with the data of runs 1 to 5 indicates that certain oxygenated organic compounds in the Synthol olefin fraction markedly inhibit the alkylation capacity of the aluminum chloride without substantially inhibiting its polymerizing effect on the monoolefins contained in the Synthol olefin fraction.

In runs 8 to 10, inclusive, the catalyst employed was a commercial phosphoric acid catalyst (about 65 per cent) supported on a siliceous adsorbent carrier. It will be seen from the data in the table that the phosphoric acid catalyst was substantially ineffective for the alkylation of toluene with a $C_{12}$ Synthol olefin fraction.

In run 11 the use of 95 per cent sulfuric acid for the alkylation of toluene with a $C_{12}$ Synthol olefin gave a low yield of alkymer.

In Table 4 are presented data obtained in the alkylation of toluene with a $C_{12}$ Synthol olefin fraction in the presence of commercial, liquid, substantially anhydrous hydrogen fluoride as the catalyst. As in the aluminum chloride runs, the catalyst was mixed in the reactor with the aromatic hydrocarbon and the olefin was gradually added to the well-stirred mixture during the course of the run. A comparison of runs 12 and 13 indicates that the low yield of alkymer in run 12 was due to the low catalyst concentration (about 2.8 volume per cent based on the total hydrocarbons charged). Apparently the amount of catalyst employed in run 12 was not sufficient to combine with oxygenated organic compounds and to form a liquid phase distinct from the

TABLE 4

*Alkylation with liquid hydrogen fluoride catalyst*

| Run No | 12 | 13 | 14 | 15 | 16 | 17 | 18 | 19 |
|---|---|---|---|---|---|---|---|---|
| Synthol Olefin Fraction, carbon atoms | | | 12 | | | | 7 | |
| Vol. per cent olefins | | | 67 | | | | 75 | |
| Boiling Range, 10–90%, °F | | | 406–412 | | | | 190–200 | |
| Aromatic | | | toluene | | | | benzene | |
| Alk. temp., °F | 80 | 85 | 85 | 170 | 110 | 80 | 180 | 185 |
| Alk. time, min | 20 | 71 | 69 | 62 | 20 | 30 | 30 | 30 |
| Charge, weight per cent on Synthol: | | | | | | | | |
| Synthol | 100 | 100 | 100 | 100 | 100 | 100 | 100 | 100 |
| Aromatic | 222 | 222 | 222 | 222 | 222 | 60 | 60 | 30 |
| Catalyst | 11 | 32 | 129 | 129 | 32 | 13 | 13 | 19 |
| Charge: | | | | | | | | |
| Synthol, cc | | | 300 | | | 545 | 545 | 728 |
| Aromatic, cc | | | 600 | | | 273 | 273 | 182 |
| Catalyst, cc | 25 | 75 | 300 | 300 | 75 | 50 | 50 | 100 |
| Recovery, Weight per cent on Synthol: | | | | | | | | |
| Synthol | 73 | 26 | 24 | 24 | 26 | 33 | 23 | 16 |
| Alkymer | 19 | 90 | 90 | 91 | 76 | | | |
| Mono-$C_7$[1] | | | | | | 58 | 58 | 26 |
| Di-$C_7$ | | | | | | 9 | 29 | 43 |
| Boiling Range, °F | | | 310–340°/5 mm. | | | | | |
| Residue | 6 | 7 | 5 | 4 | 12 | 7 | 22 | 28 |
| Alkymer, per cent of theory | 16 | 85 | 85 | 86 | 76 | 43 | 43 | 19 |

[1] Boiling range is 290–320° F. under 5 mm. Hg pressure.

hydrocarbon phase. Comparison of runs 13 and 14 indicates that increasing the concentration of liquid hydrogen fluoride from 8.3 volume per cent to 33.3 volume per cent (based on total hydrocarbons charged) did not cause a change in the yield of alkymer, which in each case was remarkably high, viz., 85 per cent of the theoretical, which should be compared with 65 per cent, the best yield obtained in a similar aluminum chloride-catalyzed alkylation reaction (run 5, Table 3).

Run 15 employed a high temperature of 170° F. compared with 80° F. and 85° F. in runs 12 and 13. It appears that substantially no advantage was gained by the high temperature operation of run 15. However, a comparison of run 15 with runs 13 and 14 shows that close temperature control is not necessary in the hydrogen fluoride-catalyzed alkylation process. A comparison of run 16 with runs 13 to 15 indicates that the time consumed in the latter runs was probably excessive, since alkylation of benzene, which is somewhat less reactive than toluene, was completed in 20 minutes at the moderate temperature of 110° F. to produce 76 per cent of the theoretical yield of alkymer. It should be noted that the yield of alkymer obtained using hydrogen fluoride as the catalyst and an oxygen-containing olefinic stock in run 15 was equal to the yield obtained in run 6 with aluminum chloride and an oxygen-free olefin.

Runs 17 to 19 present data obtained in the alkylation of benzene with a $C_7$ Synthol olefin fraction in the presence of liquid hydrogen fluoride as the catalyst. Comparison of runs 17 and 18 indicates that the principal effect of increasing the alkylation temperature from 80° F. to 180° F. was to increase the yield of diheptylbenzenes without reducing the yield of monoheptylbenzene. Comparison of runs 18 and 19 indicates that reducing the molar ratio of benzene to olefin from 1 to 0.5 results in a somewhat enhanced yield of diheptylbenzenes with appreciable reduction in the yield of monoheptylbenzene. The data of runs 17 to 19 indicate that dialkylation of a monocyclic aromatic hydrocarbon by a relatively low molecular weight Synthol olefin in the presence of hydrogen fluoride is not nearly as attractive for the production of detergent range alkymers ($C_{11}$—$C_{15}$ mono-alkyl monocyclic aromatic hydrocarbons) as mono-alkylation with an olefin having 11 to 15 carbon atoms, inclusive, in the molecule.

It will be apparent from a comparison of the data in Tables 3 and 4 that a catalyst comprising liquid, substantially anhydrous hydrogen fluoride is far superior to other catalysts such as aluminum chloride, $H_3PO_4$ or $H_2SO_4$ for the alkylation of an aromatic nucleus with Synthol olefin fractions containing preferentially oil-soluble, neutral, oxygenated organic compounds, particularly carbonyl compounds. Certain oxygenated compounds appear to be present in Synthol olefins which greatly reduce the alkylating activity of the other catalysts without reducing their polymerization activity, but do not apparently affect the alkylation activity of liquid hydrogen fluoride.

Although Table 4 presents certain specific examples concerning the alkylation of aromatics in the presence of hydrogen fluoride, it should be understood that these are illustrative and not necessarily definitive of the scope of the alkylation process.

Thus, the alkylation reaction temperature may be varied from about 50° to about 250° F., although it is usually convenient to operate at temperatures between about 80 and about 180° F. Sufficient hydrogen fluoride should be present in the reaction zone to exceed its solubility in the reactants under the reaction conditions, i. e., to provide two liquid phases in the reaction zone; the amount of hydrogen fluoride which can be employed successfully ranges from about 3 to about 100 per cent by volume based on the total charge of reactants. The presence of large amounts of hydrogen fluoride in the alkylation reaction zone has not been found to be detrimental to the alkylation reaction and amounts even in excess of 100 volume per cent may be employed; however, the employment of large excesses of hydrogen fluoride increases the amount of hydrogen fluoride which must be separated from the liquid catalyst phase in order to recover oxygenated organic compounds which have been extracted from the Synthol olefins by said catalyst phase. In general, the quantity of hydrogen fluoride catalyst required will increase directly with increase in the quantity of oxygen-containing organic compounds in the Synthol olefin fractions employed.

Upon allowing the hydrogen fluoride catalyst to evaporate from the liquid catalyst layers obtained from runs 12 and 13, the following residual oxygen-containing materials were obtained:

| Run No. | 14 | 13 |
|---|---|---|
| Volume of residue, cc | 12 | 6 |
| Weight of residue, g | 10.4 | 5.2 |
| Sp. Gr. of residue | 0.865 | 0.865 |
| R. I. ($n_D^{20}$) | 1.4942 | 1.4898 |
| Specific Dispersion | 126 | 116 |

Both oxygenated compound residues were combined and passed through a column of silica gel. Adsorbed compounds were then removed from the silica gel by elution with methanol, and fractions of 1 cc. were taken as follows:

| Fraction | $n_D^{20}$ | Remarks |
|---|---|---|
| 1 | 1.5020 | Dark color. |
| 2 | 1.5028 | Do. |
| 3 | 1.5042 | Do. |
| 4 | 1.5043 | Do. |
| 5 | 1.5056 | Do. |
| 6 | 1.5056 | Do. |
| 7 | 1.5083 | Do. |
| 8 | 1.5094 | Lighter color. |
| 9 | 1.4733 | Do. |
| 10 | 1.4567 | Fruity odor. |
| 11 | 1.4515 | Do. |
| 12 | | Methanol coming through; two layers. |

In order to furnish a more adequate description, from the operational standpoint, of our process for the treatment of Synthol olefin fractions for the recovery of oxygenated organic compounds therefrom and simultaneously to effect the alkylation of mono-olefins therein contained to produce valuable alkymers, reference is made to the accompanying figure, which is a schematic flow diagram. As shown in the figure, an alkylatable organic compound, olefin and catalyst are introduced by lines 10, 11 and 12, respectively, into reactor 13.

Suitable alkylatable organic compounds comprise paraffinic hydrocarbons containing or affording at least one tertiary carbon atom, e. g., isobutane, isopentane, methylcyclopentane, methylcyclohexane and the like; monocyclic aromatic hydrocarbons and substitution derivatives, e. g. benzene, toluene, xylenes, ethylbenzene, n- and isopropylbenzene, ethyltoluenes, pseudocumene, butylbenzenes, chlorobenzene, phenol, cresols, anisol, phenetol, benzoic acid; polycyclic aromatic hydrocarbons and substitution derivatives such as naphthalene, anthracene, diphenyl, naphthols and the like. We may of course employ mixtures of alkylatable organic compounds rather than pure chemical individuals. Thus, we employ mixtures of mono- or polycyclic aromatic hydrocarbons such as are produced by the hydroforming of naphthas in the petroleum industry or by the solvent extraction of cracked gas oils.

Although our invention is well adapted to the treatment of Synthol olefins, it will be appreciated that it may be applied to the treatment of other olefinic hydrocarbon fractions containing preferentially oil-soluble, neutral, oxygen-containing organic compounds including carbonyl compounds.

While the catalyst consists essentially of liquid, substantially anhydrous hydrogen fluoride, e. g., commercial liquid hydrogen fluoride, it should be understood that our invention may also be practiced with liquid hydrogen fluoride containing minor proportions, e. g. about 0.5 to 10 weight per cent, of other materials whose presence may affect the catalytic activity of the hydrogen fluoride, e. g., $BF_3$, $H_2SO_4$, $H_3PO_4$, $H_3BO_2F_2$, $FSO_3H$, fluorophosphoric acids, $SO_2Cl_2$, organic sulfonic acids such as ethanesulfonic or toluenesulfonic acids, trifluoroacetic acid and the like.

A particularly desirable application of our invention is the preparation of detergent alkymers and simultaneous recovery of oxygenated organic compounds from iron-catalyst Synthol olefins. To this end, the preferred charging stocks are monocyclic aromatic hydrocarbons such as benzene or toluene and iron-catalyst Synthol olefin fractions containing one or more mono-olefins having between about 10 and about 15 carbon atoms, inclusive, in the molecule. The preferred catalyst is commercial liquid, substantially anhydrous hydrogen fluoride. Accordingly, this operation will be described in connection with the figure, employing toluene and a $C_{12}$ iron-catalyst Synthol olefin fraction (boiling range about 406 to 412° F./750 mm. of Hg) containing about 67 weight per cent of olefins and about 10 volume per cent of a mixture of preferentially oil-soluble, neutral oxygenated organic compounds including carbonyl compounds, i. e., aldehydes, ketones or both.

In a preferred mode of operation, the toluene and hydrogen fluoride are mixed in the reactor and brought to the desired operating temperature and the olefinic hydrocarbon fraction is then charged continuously or intermittently into the reactor at a desired rate, e. g., at a rate at which the olefin is absorbed by the reaction mixture without excessive temperature rise. However, other methods of bringing the reactants and catalyst into contact may be employed. Thus, the toluene and Synthol olefin may be mixed in the desired molar ratio, e. g., between about 0.5/1 and 5/1 or even higher, preferably at least 1/1, and the hydrocarbon mixture brought into contact with the catalyst. We prefer to avoid contact between the olefin and hydrogen fluoride in the absence of the aromatic, since losses of olefin by polymerization or hydrofluorination are prone to occur and hydrogen fluoride-soluble polyolefinic hydrocarbon oils may be formed which will be difficult to separate from oxygenated organic compounds, since both are dissolved by the liquid hydrogen fluoride. It is preferred that the charging stock be substantially anhydrous and may be predried before passing into the reaction equipment.

The toluene and Synthol olefin are vigorously stirred or otherwise contacted with liquid hydrogen fluoride in reactor 13. Although reactor 13 is depicted in the figure as an autoclave 13 provided with an agitator 14 and temperature control jacket 15, it should be understood that, in general, agitation, reaction and settling equipment such as that employed in commercial hydrogen fluoride alkylation plants for the production of aviation gasoline components may be employed to practice the process of our invention. Upon completion of the desired alkylation reaction and extraction operations, the reaction mixture is discharged, continuously or intermittently, through valved line 16 and cooler 17, into settler 18, which is provided with a baffle or weir 19. Cooler 17 is usually operated with atmospheric cooling water and functions to adjust the temperature of the reaction mixture to about 60 to about 100° F. In settler 18 the reaction mixture stratifies into an upper predominantly hydrocarbon phase (consisting essentially of alkylated toluene, some unreacted Synthol olefins and small amounts of absorbed hydrogen fluoride) and a lower predominantly hydrogen fluoride phase containing absorbed preferentially oil-soluble, neutral, oxygen-containing organic compounds.

The lower or predominantly catalyst phase is withdrawn from settler 18 through valve line 20 and passes through heater 21 into recovery tower 22. Tower 22 functions to separate hydrogen fluoride as vapor from the less volatile oxygenated compounds present in the catalyst phase. If desired, stripping gases such as $N_2$, $CO_2$, methane, ethane, propane, butane and the like may be introduced into the lower portion of tower 22 through line 23 to aid in removing hydrogen fluoride as a vapor from the tower; alternatively or in addition, the tower may be operated under atmospheric or sub-atmospheric pressure to aid in the removal of hydrogen fluoride. Even though precautions are observed to charge substantially dry reactants and catalyst and to maintain a substantially dry reaction system, some water intrusion, although small in amount, is usually unavoidable. Some water is produced by chemical conversions which some of the oxygenated compounds undergo in the reaction zone. Water in the reaction system forms a maximum boiling azeotrope with the hydrogen fluoride. If desired the water-hydrogen fluoride azeotrope may be taken overhead through valved line 24 and passed through valved line 25 into fractionator tower 26. In tower 26, the stream containing hydrogen fluoride and the hydrogen fluoride-water azeotrope is fractionated by conventional means, such as bubble trays, to discharge substantially anhydrous hydrogen fluoride vapor overhead through valved line 27 and reject the water-hydrogen fluoride azeotrope as bottoms through valved line 28. Hydrogen fluoride vapor from lines 24 and 27 are passed through line 29 and condenser 30 back to the catalyst charging line 12. In condenser 30, inert stripping gases which enter the system by line 23 are vented or can be recycled, wholly or in part, to line 23.

A stream of oxygen-containing organic compounds is discharged from tower 22 through valved line 31. If desired, all or part of the hydrogen fluoride-water azeotrope can also be discharged through line 31. The stream in line 31 passes into washing drum 32 where it is washed with a spray of water introduced through line 33, and thence through valved line 34 into a settling drum 35. In drum 35, an aqueous lower layer and a supernatant layer of the oxygenated organic compounds are formed and discharged, respectively, through valved lines 36 and 37. The oxygenated organic compounds may be further fractionated as desired. The aqueous layer may be treated to recover hydrogen fluoride for reuse in the process. Other conventional means than the water wash shown in the figure may be employed to remove small amounts of hydrogen fluoride from the oxygenated organic compound stream. For example, the stream containing oxygenated compounds may be passed through solid KF or NaF which absorb hydrogen fluoride and from which hydrogen fluoride may be recovered by heating for reuse in our process.

The upper, predominantly hydrocarbon layer passes from settler 18 through valved line 38 and heater 39 into tower 40 in which the small amount of hydrogen fluoride contained in the entrant stream is removed as a vapor through valved line 41, whence it can be recycled to reactor 13 through valved line 42, condenser 30 and line 12; it is desirable to divert at least a portion of the stream passing through line 42 into valved line 43 to join the hydrogen fluoride stream passing through line 25 into fractionator 26 to remove water as an azeotrope with hydrogen fluoride. Suitable operating conditions in stripper 40 are a temperature between about 150 and about 550° F. and pressures between about 10 and about 100 p. s. i. g. If desired, inert stripping gases may be employed to assist in the vaporization of hydrogen fluoride in tower 40.

Hydrocarbon bottoms from tower 40 are passed through valved line 44 and heater 45 into fractionating tower 46 equipped with conventional fractionating devices. In tower 46, unreacted toluene is fractionally distilled from alkylated toluenes, unreacted Synthol mono-olefins, if any, and paraffinic hydrocarbons derived from the Synthol olefinic hydrocarbon fractions charged to the process. Toluene is passed overhead through valved line 47, whence part or all of it may be recycled through valved line 48 and condenser 49 to join toluene entering reactor 13 through line 10. Bottoms are passed from tower 46 through valved line 50 and heater 51 into fractionating tower 52.

In tower 52, alkylated toluenes are separated from unreacted components of the Synthol olefin fraction employed as one charging stock of the present process. If the mono-olefins in the Synthol fraction are substantially completely alkylated in reactor 13, the vapor stream passing overhead through valved line 53 will consist essentially of $C_{12}$ paraffins. The process of our invention can be employed to advantage to produce highly paraffinic fractions of narrow boiling range from Synthol olefin fractions; these paraffinic fractions can be applied in various processes for the preparation of chemical derivatives. Thus, the paraffinic fraction may be monohalogenated to narrow boiling range alkyl halides which can be employed in the presence of Friedel-Crafts catalysts to alkylate aromatic compounds, e. g. toluene, benzene, ethylbenzene, phenol, etc., to produce alkymers for sulfonation to yield detergents. It is thus possible to convert substantially the entire hydrocarbon content of a Synthol fraction to detergent alkymers, while conserving oxygenated compounds therein contained. Also, it is possible to react Synthol paraffinic hydrocarbon fractions derived from the practice of our invention with $SO_2$ and a halogen or sulfuryl halides in the presence of catalysts to produce alkanesulfonyl halides, particularly alkanesulfonyl chlorides, which can be converted to salts of alkanesulfonic acids having value as wetting agents and detergents and which can be employed in combination with the alkyl aromatic sulfonates prepared by our process. Numerous other uses are available for the paraffinic hydrocarbon fractions derived from the practice of the process of our invention.

Where the alkylation of olefins in reactor 13 is not carried to completion, an olefinic $C_{12}$ stream is passed overhead from tower 52 through line 53 and diverted, either wholly or in part, through valved line 54 and condenser 55 for recycle to the reactor through Synthol olefin charging line 11. Since the concentration of mono-olefins of the stream passing through line 54 is lower than that in the fresh feed charged through line 11, it is undesirable to cause undue dilution of olefins in the reactor (and attendant reduction of the alkylation reaction rate) by excessive recycling; therefore, part or all of the stream passing through line 54 may be diverted to equipment (not shown) for the concentration of olefins, whence the concentrated olefin stream may be recycled to reactor 13.

Alkymer produced by juncture of toluene and $C_{12}$ Synthol olefin and associated higher boiling materials produced by polyalkylation of toluene and of the alkymer first produced are discharged from tower 52 through valved line 56 and heater 57 into fractionating tower 58. In tower 58, the toluene $C_{12}$ olefin alkymers are taken overhead through valved line 59 and higher boiling materials (alkymers and polymers) are removed as bottoms through valved line 60, whence part or all of them may be recycled to reactor 13 to disproportionate and thus increase the yield of detergent alkymers.

Having thus described our invention, what we claim is:

1. The process which comprises contacting a monocyclic aromatic hydrocarbon under alkylating conditions of temperature and pressure with a catalyst consisting essentially of liquid hydrogen fluoride and an olefinic hydrocarbon fraction having 10 to 15 carbon atoms, inclusive, in the molecule, said olefinic hydrocarbon fraction comprising preferentially oil-soluble, neutral oxygen-containing organic compounds including organic compounds containing a carbonyl group, said olefinic hydrocarbon fraction being derived from the hydrogenation of carbon monoxide in the presence of an iron catalyst, effecting said contacting in such a manner as to avoid contact of said olefinic hydrocarbon fraction with said liquid hydrogen fluoride in the absence of said monocyclic aromatic hydrocarbon, and separating alkylation products and a partially spent liquid catalyst phase comprising said oxygen-containing organic compounds, respectively, from the alkylation reaction mixture, vaporizing substantially the entire hydrogen fluoride content of said partially spent liquid catalyst phase, liquefying vaporized hydrogen fluoride and recycling at least a portion of the liquefied hydrogen fluoride to the alkylation process.

2. A process which comprises contacting an alkylatable aromatic compound under alkylating conditions of temperature and pressure in a reaction zone with a catalyst consisting essentially of liquid hydrogen fluoride and an olefinic hydrocarbon fraction containing a mono-olefin having at least 10 carbon atoms in the molecule, said olefinic hydrocarbon fraction comprising preferentially oil-soluble, neutral, oxygen-containing organic compounds including organic compounds containing a carbonyl group, effecting said contacting in such a manner as to avoid contact of said olefinic hydrocarbon fraction with said liquid hydrogen fluoride in the absence of said alkylatable aromatic compound, separating alkylation products and a liquid catalyst phase comprising said oxygen-containing organic compounds, respectively, from the alkylation reaction mixture, vaporizing water and hydrogen fluoride from said liquid catalyst phase, thereby recovering said oxygen-containing organic compounds from said phase, thereafter separating substantially anhydrous hydrogen fluoride from an azeotrope of water and hydrogen fluoride, and recycling substantially anhydrous hydrogen fluoride thus obtained to said reaction zone.

3. The process which comprises contacting an aromatic hydrocarbon and an olefinic hydrocarbon fraction having 10 to 15 carbon atoms, inclusive, in the molecule, said olefinic hydrocarbon fraction comprising preferentially oil-soluble, neutral oxygen-containing organic compounds including organic compounds containing a carbonyl group, with a catalyst consisting essentially of liquid hydrogen fluoride under alkylating conditions of temperature and pressure while avoiding contact of said olefinic hydrocarbon fraction with said liquid hydrogen fluoride in the absence of said aromatic hydrocarbon, and separating alkylation products and a liquid catalyst phase comprising said oxygen-containing organic compounds, respectively, from the alkylation reaction mixture.

4. The process of claim 3 in which the aromatic hydrocarbon is a monocyclic aromatic hydrocarbon.

5. The process of claim 3 in which the aromatic hydrocarbon is benzene.

6. The process of claim 3 in which the aromatic hydrocarbon is toluene.

ARTHUR P. LIEN.
PHILIP HILL.
JOHN F. DETERS.

REFERENCES CITED

The following references are of record in the file of this patent:

UNITED STATES PATENTS

| Number | Name | Date |
|---|---|---|
| 2,257,074 | Goldsby | Sept. 23, 1941 |
| 2,394,905 | Frey | Feb. 12, 1946 |
| 2,423,470 | Simons | July 8, 1947 |
| 2,461,153 | Goldsby | Feb. 8, 1949 |

OTHER REFERENCES

Egloff et al., "Motor Fuel From —." Ind. Eng. Chem., vol. 29, No. 5 (May 1937). Pages 555-9 (5 pages).